(12) United States Patent
Jalaliyazdi et al.

(10) Patent No.: US 12,304,482 B2
(45) Date of Patent: May 20, 2025

(54) SYSTEMS AND METHODS FOR ESTIMATING VEHICLE PARAMETERS

(71) Applicant: GM GLOBAL TECHNOLOGY OPERATIONS LLC, Detroit, MI (US)

(72) Inventors: Milad Jalaliyazdi, Richmond Hill (CA); Mohammadali Shahriari, Markham (CA); Ashraf Abualfellat, Grand Blanc, MI (US); Dhaval Kavindra Sompura, Canton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 122 days.

(21) Appl. No.: 18/351,048

(22) Filed: Jul. 12, 2023

(65) Prior Publication Data

US 2025/0018943 A1 Jan. 16, 2025

(51) Int. Cl.
*B60W 30/14* (2006.01)
*B60W 60/00* (2020.01)

(52) U.S. Cl.
CPC ........ *B60W 30/146* (2013.01); *B60W 60/001* (2020.02); *B60W 2720/106* (2013.01); *B60W 2720/125* (2013.01)

(58) Field of Classification Search
None
See application file for complete search history.

(56) References Cited

U.S. PATENT DOCUMENTS

| | | | | |
|---|---|---|---|---|
| 10,328,935 B2 * | 6/2019 | O'Dea | ............. | B60W 60/0015 |
| 11,618,464 B2 * | 4/2023 | Stein | ................. | B60W 60/001 |
| | | | | 701/23 |
| 11,845,444 B2 * | 12/2023 | McGrory | ............ | B60W 40/13 |
| 2004/0111209 A1 * | 6/2004 | Kagawa | ........... | B60K 31/0058 |
| | | | | 701/93 |
| 2009/0192664 A1 * | 7/2009 | Wolfgang | ............. | F16H 59/52 |
| | | | | 701/64 |

(Continued)

FOREIGN PATENT DOCUMENTS

| | | | | |
|---|---|---|---|---|
| DE | 102019209406 A1 | | 12/2020 | |
| JP | 2017071394 A | * | 4/2017 | ........ B60R 16/0231 |
| WO | WO-2019179717 A1 | * | 9/2019 | ........... B60W 40/08 |

*Primary Examiner* — Rachid Bendidi
*Assistant Examiner* — Nada Mahyoob Alqaderi
(74) *Attorney, Agent, or Firm* — Lorenz & Kopf LLP

(57) ABSTRACT

Methods and systems are provided for estimating vehicle parameters of a vehicle. A maximum desired vehicle acceleration and a minimum excitation acceleration in a first direction are determined. The minimum excitation acceleration is associated with generating an estimated vehicle parameter. A first control input for transmission to an advanced driver assistance system (ADAS) to apply a temporary excitation acceleration that is greater than the minimum excitation acceleration and less than the maximum desired vehicle acceleration is generated. The estimated vehicle parameter is generated using a vehicle parameter estimation observation model based on vehicle data received from at least one vehicle sensor. The vehicle data is generated in response to the application of the temporary excitation acceleration to the vehicle. The estimated vehicle parameter is transmitted to the ADAS of the vehicle for replacement of a previous vehicle parameter at the ADAS with the estimated vehicle parameter.

20 Claims, 10 Drawing Sheets

(56) References Cited

U.S. PATENT DOCUMENTS

| | | | | |
|---|---|---|---|---|
| 2010/0305840 | A1* | 12/2010 | Doi | B62K 11/007 |
| | | | | 701/124 |
| 2013/0035829 | A1* | 2/2013 | Tiberg | B60W 40/13 |
| | | | | 701/56 |
| 2013/0138288 | A1* | 5/2013 | Nickolaou | B60W 40/13 |
| | | | | 701/99 |
| 2015/0298706 | A1* | 10/2015 | Hall | G01G 19/086 |
| | | | | 701/37 |
| 2017/0160745 | A1* | 6/2017 | Lauffer | G08G 1/163 |
| 2018/0194357 | A1* | 7/2018 | Hall | G07C 5/0808 |
| 2018/0245966 | A1* | 8/2018 | Mittal | G01G 21/00 |
| 2020/0232842 | A1* | 7/2020 | Huang | B60W 30/143 |
| 2020/0307573 | A1* | 10/2020 | Kato | B60W 60/0027 |
| 2020/0317198 | A1* | 10/2020 | Hashemi | B60W 40/068 |
| 2021/0300418 | A1* | 9/2021 | Alvarez | G08G 1/096791 |
| 2022/0063669 | A1* | 3/2022 | Fukushige | B60W 60/00253 |
| 2022/0219691 | A1* | 7/2022 | Maleki | G06F 11/0754 |
| 2024/0053187 | A1* | 2/2024 | van Thiel | G01G 19/086 |

* cited by examiner

SYSTEMS AND METHODS FOR ESTIMATING VEHICLE PARAMETERS

INTRODUCTION

The technical field generally relates to vehicles, and more particularly relates to systems and methods for estimating vehicle parameters.

Vehicles are often provided with default vehicle parameters. In many instances, changes in vehicle parameters may alter the longitudinal and lateral responses of the vehicle thereby impacting the implementation of various advanced driver assistance system (ADAS) features. Examples of such vehicle parameters include a vehicle mass, a moment of inertia $I_z$ of the vehicle $I_z$, and an understeer gradient $K_{US}$ of the vehicle. Examples of ADAS features that may be impacted by changes in the vehicle parameters include, but are not limited to, adaptive cruise control (ACC) and super cruise (SC) control.

Accordingly, it is desirable to provide improved methods and systems to estimate vehicle parameters based on an application of additional excitation to the vehicle and to update the vehicle parameters with the estimated vehicle parameters to facilitate operation of the ADAS. Other desirable features and characteristics will become apparent from the subsequent detailed description and the appended claims, taken in conjunction with the accompanying drawings and the foregoing technical field and background.

SUMMARY

In various embodiments, a vehicle parameter estimation system of a vehicle includes at least one processor and at least one memory communicatively coupled to the at least one processor. The at least one memory includes instructions that upon execution by the at least one processor, cause the at least one processor to determine a maximum desired vehicle acceleration in a first direction; determine a minimum excitation acceleration in the first direction, the minimum excitation acceleration being associated with generating an estimated vehicle parameter; generate a first control input for transmission to an advanced driver assistance system (ADAS) of the vehicle to apply a temporary excitation acceleration that is greater than the minimum excitation acceleration and less than the maximum desired vehicle acceleration to the vehicle in the first direction; generate the estimated vehicle parameter using a vehicle parameter estimation observation model based on vehicle data received from at least one vehicle sensor, the vehicle data being generated in response to an application of the temporary excitation acceleration to the vehicle; and transmit the estimated vehicle parameter to the ADAS of the vehicle for replacement of a previous vehicle parameter at the ADAS with the estimated vehicle parameter.

In various embodiments, the at least one memory includes further instructions that upon execution by the at least one processor, cause the at least one processor to determine the maximum desired vehicle acceleration based on at least a maximum safe acceleration in the first direction.

In various embodiments, the at least one memory includes further instructions that upon execution by the at least one processor, cause the at least one processor to determine the maximum desired vehicle acceleration based on at least a maximum occupant comfort acceleration in the first direction.

In various embodiments, the at least one memory includes further instructions that upon execution by the at least one processor, cause the at least one processor to generate the first control input for transmission to the ADAS of the vehicle to apply the temporary excitation acceleration to the vehicle in the first direction, the first direction being a longitudinal direction.

In various embodiments, the at least one memory includes further instructions that upon execution by the at least one processor, cause the at least one processor to generate the estimated vehicle parameter using the vehicle parameter estimation observation model based on the vehicle data received from the at least one vehicle sensor, wherein: the vehicle data is generated in response to the application of the temporary excitation acceleration to the vehicle in the longitudinal direction, the vehicle parameter estimation observation model is a vehicle mass estimation observation model, and the estimated vehicle parameter generated by the vehicle parameter estimation observation model is an estimated vehicle mass.

In various embodiments, the at least one memory includes further instructions that upon execution by the at least one processor, cause the at least one processor to generate the first control input for transmission to the ADAS of the vehicle to apply the temporary excitation acceleration to the vehicle in the first direction, the first direction being a lateral direction.

In various embodiments, the at least one memory includes further instructions that upon execution by the at least one processor, cause the at least one processor to generate the estimated vehicle parameter using the vehicle parameter estimation observation model based on the vehicle data received from the at least one vehicle sensor, wherein: the vehicle data is generated in response to the application of the temporary excitation acceleration to the vehicle in the lateral direction; the vehicle parameter estimation observation model is a vehicle moment of inertia estimation observation model; and the estimated vehicle parameter is an estimated moment of inertia of the vehicle.

In various embodiments, the at least one memory includes further instructions that upon execution by the at least one processor, cause the at least one processor to receive the estimated vehicle parameter generated by the vehicle parameter estimation observation model based on the vehicle data received from the at least one vehicle sensor, wherein: the vehicle data is generated in response to the application of the temporary excitation acceleration to the vehicle in the lateral direction; the vehicle parameter estimation observation model is an understeer gradient estimation observation model; and the estimated vehicle parameter is an understeer gradient of the vehicle.

In various embodiments, the at least one memory includes further instructions that upon execution by the at least one processor, cause the at least one processor to select a vehicle route that enables the application of the temporary excitation acceleration to the vehicle in the first direction.

In various embodiments, the at least one memory includes further instructions that upon execution by the at least one processor, cause the at least one processor to select a vehicle route that includes at least one curved portion to enable the application of the temporary excitation acceleration to the vehicle in the first direction, the first direction being a lateral direction.

In various embodiments, the at least one memory includes further instructions that upon execution by the at least one processor, cause the at least one processor to select a vehicle route that includes at least one straight portion to enable the application of the temporary excitation acceleration to the vehicle in the first direction, the first direction being a longitudinal direction.

In various embodiments, the at least one memory includes further instructions that upon execution by the at least one processor, cause the at least one processor to determine whether a vehicle route includes a downhill grade; and generate the first control input for transmission to the ADAS of the vehicle to apply the temporary excitation acceleration to the vehicle in the first direction based on the determination, the first direction being a longitudinal direction and the temporary excitation acceleration being a temporary positive acceleration followed by a temporary negative acceleration.

In various embodiments, the at least one memory includes further instructions that upon execution by the at least one processor, cause the at least one processor to determine whether a vehicle route includes an uphill grade; and generate the first control input for transmission to the ADAS of the vehicle to apply the temporary excitation acceleration to the vehicle in the first direction based on the determination, the first direction being a longitudinal direction and the temporary excitation acceleration being a temporary negative acceleration followed by a temporary positive acceleration.

In various embodiments, the at least one memory includes further instructions that upon execution by the at least one processor, cause the at least one processor to upon a determination by the vehicle parameter estimation model that the estimated vehicle parameter has converged, generate a second control input for transmission to the ADAS of the vehicle to cease the application of the temporary excitation acceleration to the vehicle in the first direction.

In various embodiments, a method for estimating vehicle parameters of a vehicle includes: determining a maximum desired vehicle acceleration in a first direction; determining a minimum excitation acceleration in the first direction, the minimum excitation acceleration being associated with generating an estimated vehicle parameter; generating a first control input for transmission to an advanced driver assistance system (ADAS) of the vehicle to apply a temporary excitation acceleration that is greater than the minimum excitation acceleration and less than the maximum desired vehicle acceleration to the vehicle in the first direction; generating the estimated vehicle parameter using a vehicle parameter estimation observation model based on vehicle data received from at least one vehicle sensor, the vehicle data being generated in response to an application of the temporary excitation acceleration to the vehicle; and transmitting the estimated vehicle parameter to the ADAS of the vehicle for replacement of a previous vehicle parameter at the ADAS with the estimated vehicle parameter.

In various embodiments, the method further includes determining the maximum desired vehicle acceleration based on at least a maximum safe acceleration in the first direction.

In various embodiments, the method further includes determining the maximum desired vehicle acceleration based on at least a maximum occupant comfort acceleration in the first direction.

In various embodiments, the method further includes generating the first control input for transmission to the ADAS of the vehicle to apply the temporary excitation acceleration to the vehicle in the first direction, the first direction being a longitudinal direction.

In various embodiments, the method further includes comprising generating the first control input for transmission to the ADAS of the vehicle to apply the temporary excitation acceleration to the vehicle in the first direction, the first direction being a lateral direction.

In various embodiments, a vehicle includes a vehicle parameter estimation system. The vehicle parameter estimation system includes at least one processor and at least one memory communicatively coupled to the at least one processor. The at least one memory includes instructions that upon execution by the at least one processor, cause the at least one processor to: determine a maximum desired vehicle acceleration in a first direction; determine a minimum excitation acceleration in the first direction, the minimum excitation acceleration being associated with generating an estimated vehicle parameter; generate a first control input for transmission to an advanced driver assistance system (ADAS) of the vehicle to apply a temporary excitation acceleration that is greater than the minimum excitation acceleration and less than the maximum desired vehicle acceleration to the vehicle in the first direction; generate the estimated vehicle parameter using a vehicle parameter estimation observation model based on vehicle data received from at least one vehicle sensor, the vehicle data being generated in response to an application of the temporary excitation acceleration to the vehicle; and transmit the estimated vehicle parameter to the ADAS of the vehicle for replacement of a previous vehicle parameter at the ADAS with the estimated vehicle parameter.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
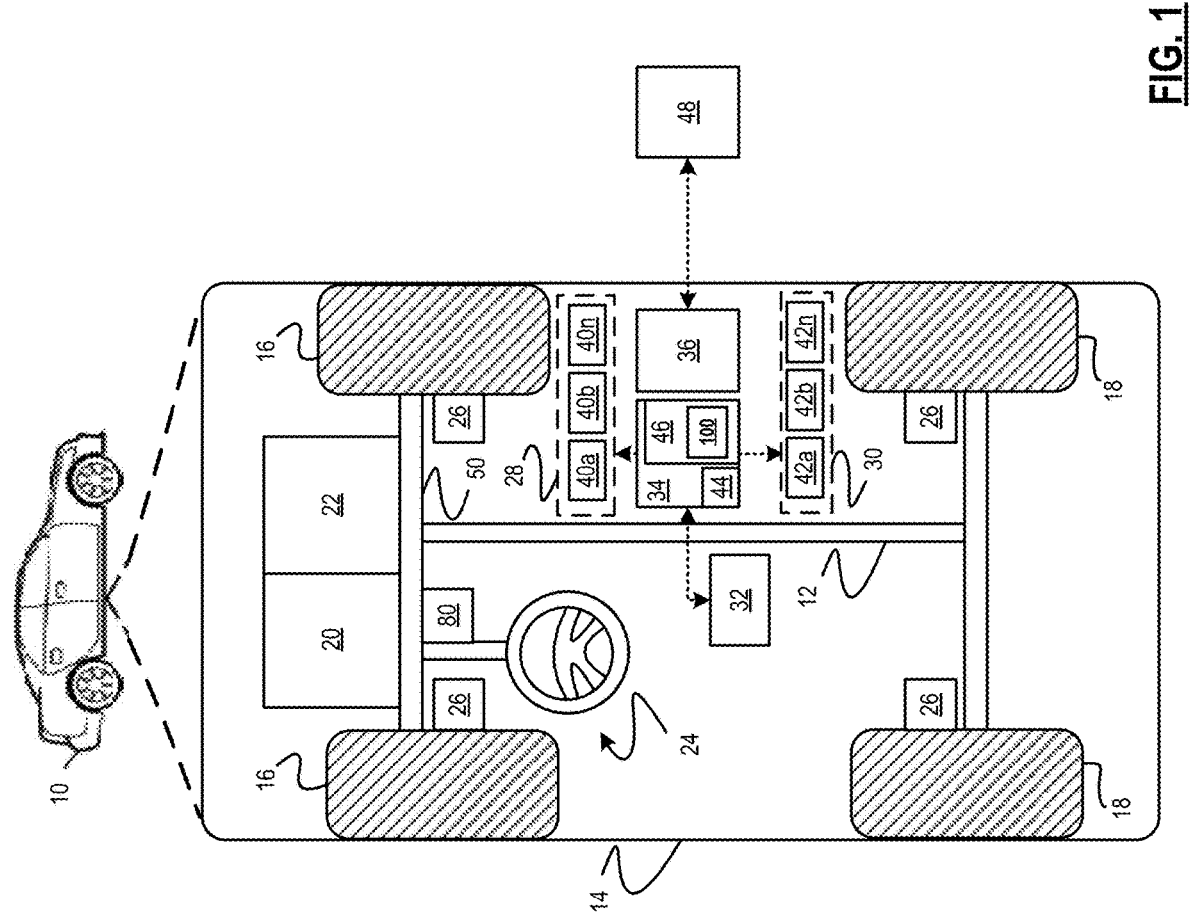
FIG. 1 is a functional block diagram of a vehicle including a vehicle parameter estimation system in accordance with at least one embodiment.

Referring to FIG. 1, a functional block diagram of a vehicle 10 including a vehicle parameter estimation system 100 in accordance with at least one embodiment is shown. The vehicle 10 generally includes a chassis 12, a body 14, front wheels 16, and rear wheels 18. The vehicle 10 is depicted in the illustrated embodiment as a passenger car, but it should be appreciated that the vehicle parameter estimation system 100 may be included within any other vehicle including trucks, sport utility vehicles (SUVs), recreational vehicles (RVs), etc., can also be used.

In various embodiments, the body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous or semi-autonomous vehicle that is automatically controlled to carry passengers and/or cargo from one place to another. For example, in an exemplary embodiment, the vehicle 10 is a so-called Level Two, Level Three, Level Four or Level Five automation system. Level two automation means the vehicle assists the driver in various driving tasks with driver supervision. Level three automation means the vehicle can take over all driving functions under certain circumstances. All major functions are automated, including braking, steering, and acceleration. At this level, the driver can fully disengage until the vehicle tells the driver otherwise. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the vehicle 10 generally includes a propulsion system 20 a transmission system 22, a steering system 24, a braking system 26, a sensor system 28, an actuator system 30, at least one data storage device 32, at least one controller 34, and a communication system 36. The controller 34 is configured to implement an advanced driver assistance system (ADAS). The propulsion system 20 is configured to generate power to propel the vehicle. The propulsion system 20 may, in various embodiments, include an internal combustion engine, an electric machine such as a traction motor, a fuel cell propulsion system, and/or any other type of propulsion configuration. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The braking system 26 is configured to provide braking torque to the vehicle wheels 16-18. The braking system 26 may, in various embodiments, include friction brakes, brake by wire, a regenerative braking system such as an electric machine, and/or other appropriate braking systems.

The steering system 24 is configured to influence a position of the of the vehicle wheels 16. While depicted as including a steering wheel and steering column, for illustrative purposes, in some embodiments contemplated within the scope of the present disclosure, the steering system 24 may not include a steering wheel and/or steering column. The steering system 24 includes a steering column coupled to an axle 50 associated with the front wheels 16 through, for example, a rack and pinion or other mechanism (not shown). Alternatively, the steering system 24 may include a steer by wire system that includes actuators associated with each of the front wheels 16.

The sensor system 28 includes one or more sensing devices 40a-40n that sense observable conditions of the exterior environment and/or the interior environment of the vehicle 10. The sensing devices 40a-40n can include, but are not limited to, radars, lidars, global positioning systems, optical cameras, thermal cameras, ultrasonic sensors, and/or other sensors.

The vehicle dynamics sensors provide vehicle dynamics data including longitudinal speed, yaw rate, lateral acceleration, longitudinal acceleration, etc. The vehicle dynamics sensors may include wheel sensors that measure information pertaining to one or more wheels of the vehicle 10. In one embodiment, the wheel sensors comprise wheel speed sensors that are coupled to each of the wheels 16-18 of the vehicle 10. Further, the vehicle dynamics sensors may include one or more accelerometers (provided as part of an Inertial Measurement Unit (IMU)) that measure information pertaining to an acceleration of the vehicle 10. In various embodiments, the accelerometers measure one or more acceleration values for the vehicle 10, including latitudinal and longitudinal acceleration and yaw rate.

The actuator system 30 includes one or more actuator devices 42a-42n that control one or more vehicle features such as, but not limited to, the propulsion system 20, the transmission system 22, the steering system 24, and the braking system 26. In various embodiments, the vehicle features can further include interior and/or exterior vehicle features such as, but are not limited to, doors, a trunk, and cabin features such as air, music, lighting, etc. (not numbered).

The communication system 36 is configured to wirelessly communicate information to and from other entities 48, such as but not limited to, other vehicles ("V2V" communication,) infrastructure ("V2I" communication), remote systems, and/or personal devices. In an exemplary embodiment, the communication system 36 is a wireless communication system configured to communicate via a wireless local area network (WLAN) using IEEE 802.11 standards or by using cellular data communication. However, additional, or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in the ADAS of the vehicle 10. In various embodiments, the data storage device 32 stores defined maps of the navigable environment. In various embodiments, the defined maps may be predefined by and obtained from a remote system. For example, the defined maps may be assembled by the remote system and communicated to the vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the vehicle 10. In various embodiments, the controller(s) 34 are configured to implement ADAS.

Figure 2:
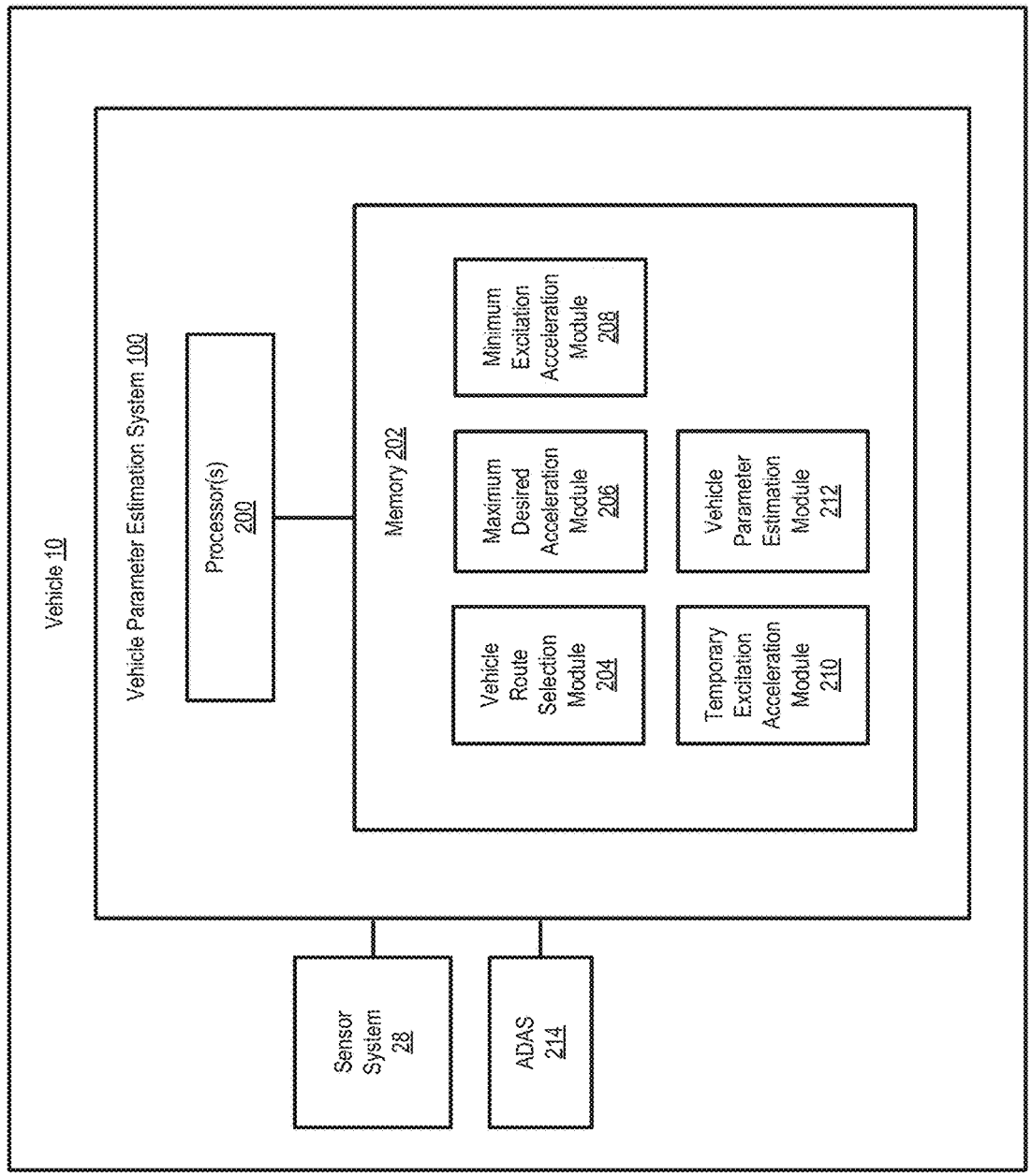
FIG. 2 is a functional block diagram of a vehicle parameter estimation system in accordance with at least one embodiment.

Referring to FIG. 2, a functional block diagram of a vehicle parameter estimation system 100 in accordance with at least one embodiment is shown. In various embodiments, the vehicle parameter estimation system 100 is a controller 34. The vehicle parameter estimation system 100 includes at least one processor 200, and at least one memory 202. The processor(s) 200 is communicatively coupled to the at least one memory 202. The processor(s) 200 is a programable device that includes one or more instructions stored in or associated with the at least one memory 202. The at least one memory 202 includes instructions that the processor(s) 200 is configured to execute. The at least one memory 202 includes a vehicle route selection module 204, a maximum desired acceleration module 206, a minimum excitation acceleration module 208, a temporary excitation acceleration module 210, and a vehicle parameter estimation module 212.

The vehicle parameter estimation system 100 is configured to be communicatively coupled to an ADAS 214 of the vehicle 10 and to a sensor system 28. The vehicle parameter estimation system 100 may include additional components that facilitate operation of the vehicle parameter estimation system 100. The operation of the vehicle parameter estimation system 100 will be described in greater detail below.

Figure 3:
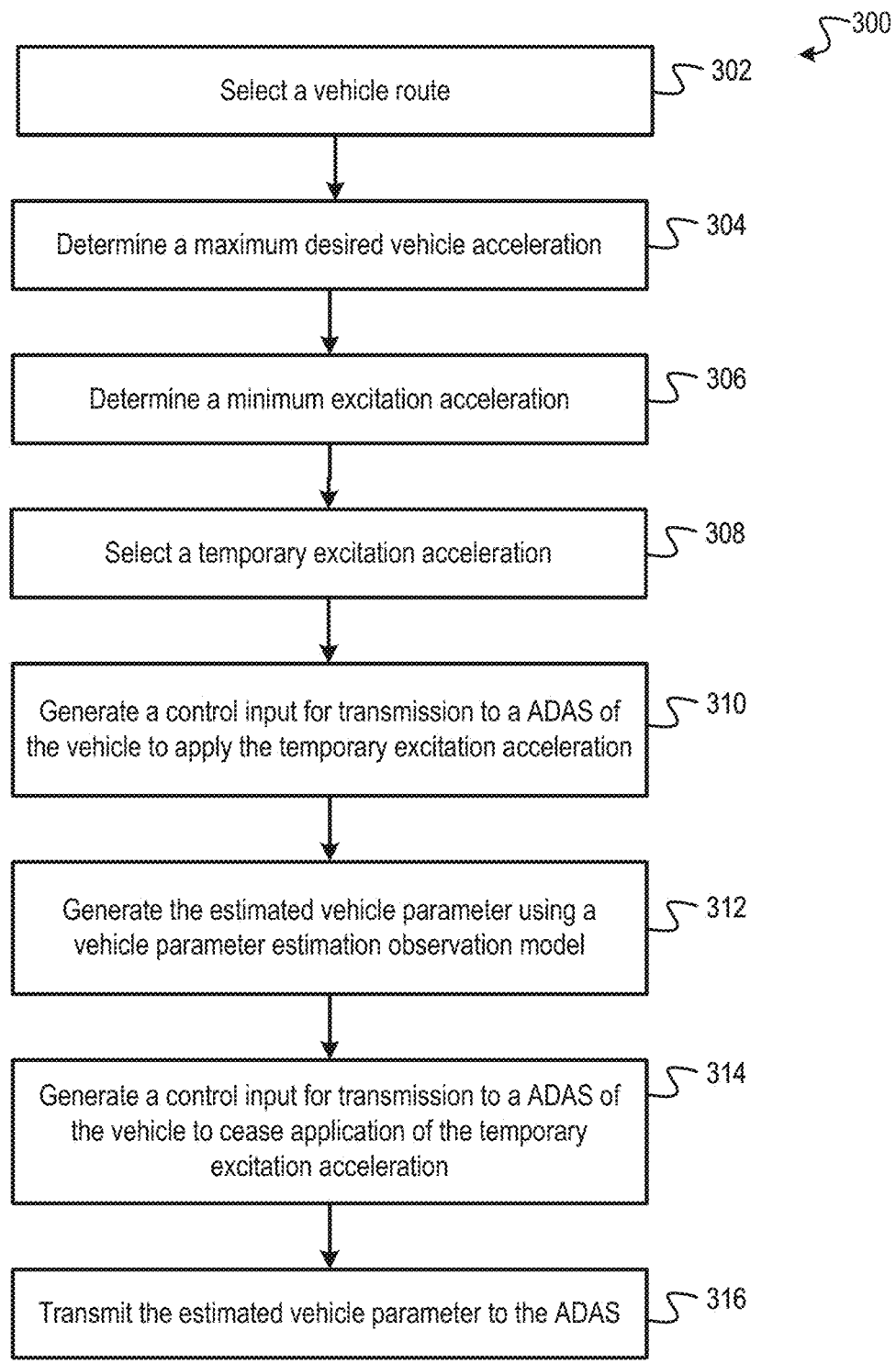
FIG. 3 is a flowchart representation of an exemplary method of estimating vehicle parameters of a vehicle in accordance with at least one embodiment.

Referring to FIG. 3, a flowchart representation of an exemplary method 300 of estimating vehicle parameters of a vehicle 10 in accordance with at least one embodiment is shown. The method 300 will be described with reference to an exemplary implementation of the vehicle parameter estimation system 100. As can be appreciated in light of the disclosure, the order of operation within the method 300 is not limited to the sequential execution as illustrated in FIG. 3 but may be performed in one or more varying orders as applicable and in accordance with the present disclosure.

Vehicle parameters that the ADAS 214 of a vehicle 10 may rely on to facilitate operation of the vehicle 10 include, vehicle mass, a moment of inertia of the vehicle $I_z$, and an understeer gradient $K_{US}$ of the vehicle 10. The vehicle 10 may initially be provided with default vehicle parameters. The vehicle parameters of the vehicle 10 may change over time and/or under different operating conditions. The vehicle parameter estimation system 100 is configured to generate estimated vehicle parameters based on an application of a temporary excitation acceleration to the vehicle 10 and transmit the generated estimated vehicle parameters to the ADAS 214 so that the ADAS 214 is able to use the estimated vehicle parameters to update the vehicle parameters that are used by the ADAS 214 in the implementation of one or more ADAS features. Examples of estimated vehicle parameters include, but are not limited to estimated vehicle mass, estimated moment of inertia $I_Z$ of the vehicle 10, and an estimated understeer gradient $K_{US}$ of the vehicle 10.

At 302, the vehicle route selection module 204 is configured to select a vehicle route for the vehicle 10 based on the estimated vehicle parameter(s) that will be generated by the vehicle parameter estimation system 100. In at least one embodiment, the vehicle route selection module 204 is configured to select a vehicle route that generates the desired excitation for estimating the vehicle parameter(s). If the vehicle parameter estimation system 100 is generating an estimated vehicle mass, the vehicle route selection module 204 is configured to select a vehicle route that includes a straight portion on the vehicle route. If the vehicle parameter estimation system 100 is generating an estimated moment of inertia $I_Z$ and/or an understeer gradient $K_{US}$, the vehicle route selection module 204 is configured to select a vehicle route that includes a curved portion on the vehicle route. In various embodiments, the vehicle route selection module 204 is configured to provide the selected vehicle route as a suggested vehicle route to the driver of the vehicle 10 via a vehicle output device, such as for example via a vehicle display. In various embodiments, the vehicle route selection module 204 is configured to provide the selected vehicle route to the ADAS 214 of the vehicle 10. The selection of the vehicle route will be described in greater detail with reference to FIG. 10 and FIG. 11 below.

At 304, the maximum desired acceleration module 206 is configured to a determine a maximum desired acceleration of the vehicle 10 in a specific direction based on the estimated vehicle parameter(s) being generated by the vehicle parameter estimation system 100. The maximum desired acceleration has a different value for different directions. In various embodiments, the maximum desired acceleration in the different directions are pre-defined values. In various embodiments, the maximum desired acceleration is based on one or more vehicle states. In various embodiments, the maximum desired acceleration module 206 is configured to adapt the maximum desired acceleration based on the one or more vehicle states. Examples of vehicle states include, but are not limited to, current vehicle speed in a longitudinal direction and current vehicle load. The longitudinal direction is the direction of travel of the vehicle 10.

In various embodiments, the maximum desired acceleration is based on a maximum safe acceleration of the vehicle 10 in the specific direction. In various embodiments, the maximum desired acceleration is based on a maximum occupant comfort acceleration of the vehicle 10 in the specific direction. In various embodiments, the maximum desired acceleration is based on a maximum safe acceleration and a maximum occupant comfort acceleration of the vehicle 10 in the specific direction. In various embodiments, the maximum desired acceleration defines the maximum temporary excitation acceleration that can be applied to the vehicle 10 in the specific direction while ensuring vehicle safety and vehicle occupant comfort.

If the vehicle parameter estimation system 100 is generating an estimated vehicle mass, the maximum desired acceleration module 206 is configured to determine a maximum desired acceleration of the vehicle 10 in a longitudinal direction. If the vehicle parameter estimation system 100 is generating an estimated moment of inertia $I_Z$ and/or an understeer gradient $K_{US}$, the maximum desired acceleration module 206 is configured to determine a maximum desired acceleration of the vehicle 10 in a lateral direction. The lateral direction is perpendicular to the direction of travel of the vehicle 10.

At 306, the minimum excitation acceleration module 208 is configured to a determine a minimum excitation acceleration the vehicle 10 in a specific direction based on the estimated vehicle parameter(s) being generated by the vehicle parameter estimation system 100. The minimum excitation acceleration of the vehicle 10 has a different value for different directions. In various embodiments, the minimum excitation acceleration of the vehicle 10 in the different directions are pre-defined values. In various embodiments, the minimum excitation acceleration is based on one or more vehicle states. In various embodiments, the minimum excitation acceleration module 208 is configured to adapt the minimum excitation acceleration based on the one or more vehicle states. Examples of vehicle states include, but are not limited to, current vehicle speed in a longitudinal direction and current vehicle load. The longitudinal direction is the direction of travel of the vehicle 10. The minimum excitation acceleration is the minimum amount of excitation acceleration needed to generate the estimated vehicle parameter for the vehicle 10.

If the vehicle parameter estimation system 100 is generating an estimated vehicle mass, the minimum excitation acceleration module 208 is configured to determine a minimum excitation acceleration of the vehicle 10 in a longitudinal direction. If the vehicle parameter estimation system 100 is generating an estimated moment of inertia $I_Z$ and/or an understeer gradient $K_{US}$, the minimum excitation acceleration module 208 is configured to determine a minimum excitation acceleration of the vehicle 10 in a lateral direction.

At 308, the temporary excitation acceleration module 210 is configured to select a temporary excitation acceleration that is greater than the minimum excitation acceleration and less than the maximum desired vehicle acceleration in a specific direction. If the vehicle parameter estimation system 100 is generating an estimated vehicle mass, the temporary excitation acceleration module 210 is configured to select a temporary excitation acceleration of the vehicle 10 in a longitudinal direction. The temporary excitation acceleration module 210 is configured to select a temporary excitation acceleration that is greater than the minimum excitation acceleration and less than the maximum desired vehicle acceleration in the longitudinal direction. If the vehicle parameter estimation system 100 is generating an estimated moment of inertia $I_Z$ and/or an understeer gradient $K_{US}$, the temporary excitation acceleration module 210 is configured to select a temporary excitation acceleration of the vehicle 10 in a lateral direction. The temporary excitation acceleration module 210 is configured to select a temporary excitation acceleration that is greater than the minimum excitation acceleration and less than the maximum desired vehicle acceleration in the lateral direction.

At 310, the temporary excitation acceleration module 210 is configured to generate a control input for transmission to the ADAS 214 of the vehicle 10 to apply the temporary excitation acceleration in the specified direction. If the vehicle parameter estimation system 100 is generating an estimated vehicle mass, the temporary excitation acceleration module 210 is configured to generate a control input for transmission to the ADAS 214 of the vehicle 10 to apply the temporary excitation acceleration in the longitudinal direction. If the vehicle parameter estimation system 100 is generating an estimated moment of inertia $I_Z$ and/or an understeer gradient $K_{US}$, the temporary excitation acceleration module 210 is configured to generate a control input for transmission to the ADAS 214 of the vehicle 10 to apply the temporary excitation acceleration in the lateral direction.

One or more vehicle sensors in the sensor system 28 generate vehicle data in response to the application of the temporary excitation acceleration to vehicle 10. At 312, the vehicle parameter estimation module 212 generates the estimated vehicle parameter using a vehicle parameter estimation observation model. The vehicle parameter estimation module 212 is configured to receive the vehicle data generated by the sensor system 28 in response to the application of the temporary excitation acceleration to vehicle 10. The vehicle parameter estimation module 212 includes one or more vehicle parameter estimation observation models. Each vehicle parameter estimation observation model is constructed for a specific vehicle parameter estimation. The vehicle parameter estimation observation model for a specific vehicle parameter estimation is configured to generate the vehicle parameter estimation based on received vehicle data associated with that vehicle parameter estimation. In various embodiments, vehicle parameter estimation module 212 includes a vehicle mass estimation observation model, a vehicle moment of inertia estimation observation model, and an understeer gradient estimation observation model.

When the vehicle parameter estimation system 100 is generating an estimated vehicle mass, the vehicle mass estimation observation model is configured to receive the vehicle data generated by the sensor system 28 in response to the application of the temporary excitation acceleration to vehicle 10 in the longitudinal direction and generate the estimated vehicle mass. The vehicle mass estimation observation model is configured to determine when the estimated vehicle mass generated by the vehicle mass estimation observation model has converged to an estimated value for the estimated vehicle mass and generate the converged estimated value as the estimated vehicle mass. The application of the temporary excitation acceleration to vehicle 10 in the longitudinal direction may enable a vehicle mass estimation observation model to increase the accuracy of the estimated vehicle mass and/or increase the speed with which the estimated vehicle mass converges to an estimated value.

When the vehicle parameter estimation system 100 is generating an estimated moment of inertia $I_Z$ of the vehicle 10 the vehicle moment of inertia estimation observation model is configured to receive the vehicle data generated by the sensor system 28 in response to the application of the temporary excitation acceleration to vehicle 10 in the lateral direction and generate the estimated vehicle moment of inertia $I_Z$. The vehicle moment of inertia estimation observation model is configured to determine when the estimated moment of inertia $I_Z$ generated by the vehicle moment of inertia estimation observation model has converged to an estimated value for the estimated moment of inertia $I_Z$ and generate the converged estimated value as the estimated moment of inertia $I_Z$. The application of the temporary excitation acceleration to vehicle 10 in the lateral direction may enable a vehicle moment of inertia estimation observation model to increase the accuracy of the estimated moment of inertia $I_Z$ and/or increase the speed with which the estimated moment of inertia $I_Z$ converges to an estimated value.

When the vehicle parameter estimation system 100 is generating an estimated understeer gradient $K_{US}$, the understeer gradient estimation observation model is configured to receive the vehicle data generated by the sensor system 28 in response to the application of the temporary excitation acceleration to vehicle 10 in the lateral direction and generate the estimated understeer gradient $K_{US}$. The understeer gradient estimation observation model is configured to determine when the estimated understeer gradient $K_{US}$ generated by the understeer gradient estimation observation model has converged to an estimated value for the estimated understeer gradient $K_{US}$ and generate the converged estimated value as the estimated understeer gradient $K_{US}$. The application of the temporary excitation acceleration to vehicle 10 in the lateral direction may enable an understeer gradient estimation observation model to increase the accuracy of the estimated understeer gradient $K_{US}$ and/or increase the speed with which the estimated understeer gradient $K_{US}$ converges to an estimated value.

At 314, the vehicle parameter estimation module 212 generates a control input for transmission to the ADAS 214 of the vehicle 10 to cease the application of the temporary excitation acceleration. The vehicle parameter estimation module 212 generates a control input for transmission to the ADAS 214 of the vehicle 10 to cease the application of the temporary excitation acceleration upon the convergence of the estimated vehicle parameter to an estimated value. At 316, the vehicle parameter estimation module 212 transmits the estimated vehicle parameter to the ADAS 214 of the vehicle 10. The ADAS 214 updates the estimated vehicle parameter with the received estimated vehicle parameter. The ADAS 214 implements ADAS features in accordance with the received estimated vehicle parameters.

Figure 4:
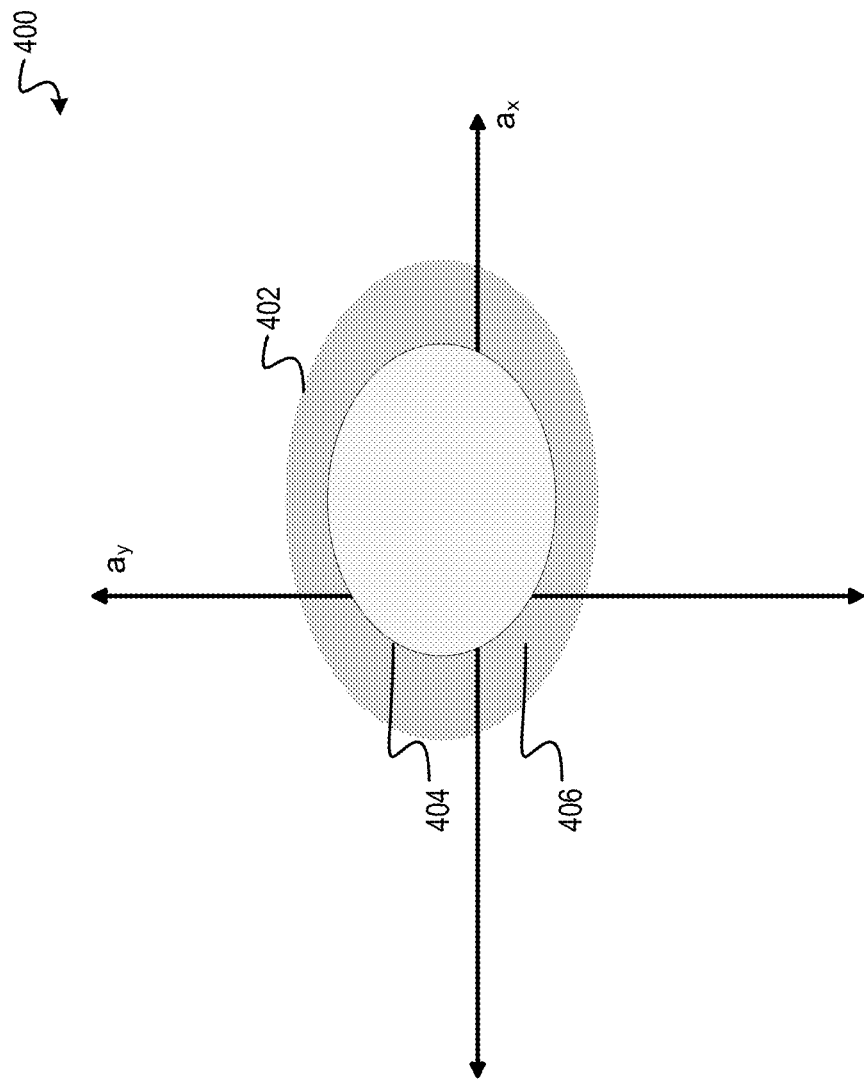
FIG. 4 is a graphical representation of exemplary boundaries associated with a determination of a temporary excitation acceleration in accordance with at least one embodiment.

Referring to FIG. 4, a graphical representation of exemplary boundaries associated with a determination of a temporary excitation acceleration 400 in accordance with at least one embodiment is shown. The x-axis represents vehicle acceleration in a lateral direction $a_x$ and the y-axis represents vehicle acceleration in a longitudinal direction $a_y$. The oval 402 represents a maximum desired acceleration based on a maximum safe acceleration and a maximum occupant comfort acceleration of the vehicle 10. The oval 404 represents a minimum excitation acceleration of the vehicle 10. The minimum excitation acceleration is the minimum amount of excitation acceleration needed for a parameter estimation observation model to generate the associated estimated vehicle parameter for the vehicle 10. The maximum desired acceleration and the minimum excitation acceleration is based on one or more current vehicle states. An example of a current vehicle state is current vehicle speed.

The region 406 represents the temporary excitation accelerations that are greater than the minimum excitation acceleration and less than the maximum desired acceleration. The temporary excitation acceleration is selected from the region 406. The application of a temporary excitation acceleration selected from the region 406 may maximize convergence of a estimated vehicle parameter by the associated vehicle parameter estimation observation model while maintaining vehicle safety and vehicle occupant comfort.

When the vehicle parameter estimation system 100 is estimating a vehicle mass, the temporary excitation acceleration is applied in a longitudinal direction. When the vehicle parameter estimation system 100 is estimating a moment of inertia $I_Z$ and/or understeer gradient $K_{US}$, the temporary excitation acceleration is applied in a lateral direction.

Figure 5:
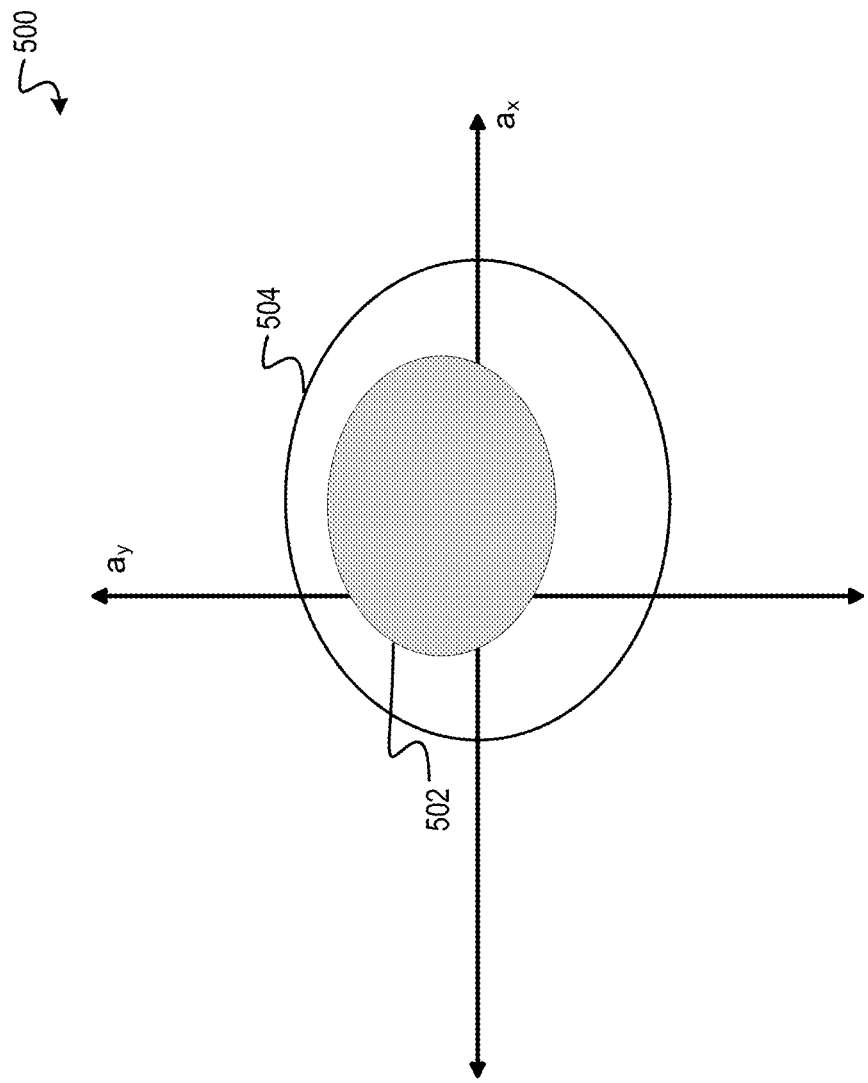
FIG. 5 is a graphical representation of exemplary boundaries that do not permit the application of a temporary excitation acceleration to the vehicle in accordance with at least one embodiment.

Referring to FIG. 5, a graphical representation of exemplary boundaries that do not permit the application of a temporary excitation acceleration to the vehicle 10 in accordance with at least one embodiment is shown. The x-axis represents vehicle acceleration in a lateral direction $a_x$ and the y-axis represents vehicle acceleration in a longitudinal direction $a_y$. The oval 502 represents a maximum desired acceleration is based on a maximum safe acceleration and a maximum occupant comfort acceleration of the vehicle 10. The oval 504 represents a minimum excitation acceleration of the vehicle 10. The minimum excitation acceleration is the minimum amount of excitation acceleration needed for a parameter estimation observation model to generate the associated estimated vehicle parameter for the vehicle 10. The maximum desired acceleration and the minimum excitation acceleration is based on one or more current vehicle states. An example of a current vehicle state is current vehicle speed. The current speed of the vehicle 10 in FIG. 5 is less than the current speed of the vehicle 10 in FIG. 4. The minimum excitation acceleration (represented by oval 504) needed to generate convergence of a estimated vehicle parameter by the associated vehicle parameter estimation observation model is greater than maximum desired acceleration (represented by oval 502) at the current vehicle speed. Since a minimum excitation acceleration cannot be implemented while maintaining vehicle safety and vehicle occupant comfort, a temporary excitation acceleration in either a longitudinal direction or a lateral direction cannot be applied to the vehicle 10 to generate convergence of an estimated vehicle parameter by the associated vehicle parameter estimation observation model.

Figure 6:
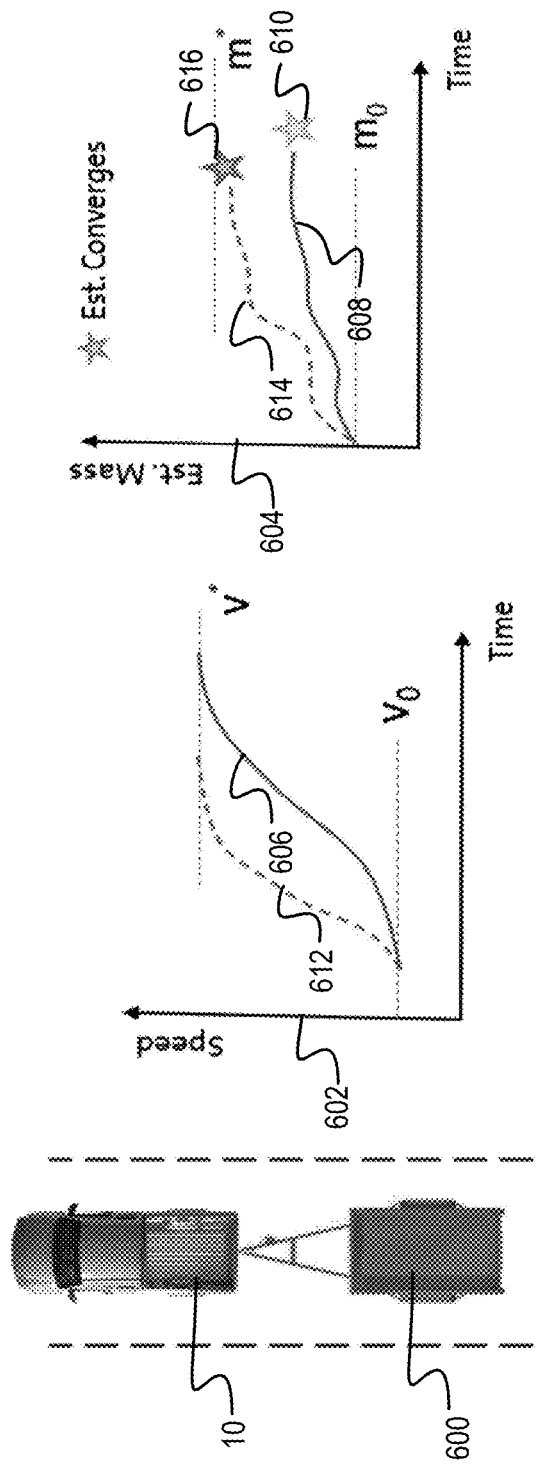
FIG. 6 is an exemplary illustration associated with generation of an estimated vehicle mass of a vehicle by a vehicle parameter estimation system in accordance with at least one embodiment.

Referring to FIG. 6, an exemplary illustration associated with generation of an estimated vehicle mass of a vehicle 10 by a vehicle parameter estimation system 100 in accordance with at least one embodiment is shown. The ADAS 214 of the vehicle 10 was previously provided with a default vehicle mass $m_0$. The vehicle 10 has been attached to a trailer 600 so that the actual vehicle mass m* as defined by the combination of the mass of the vehicle 10 and the mass of the trailer 600 has changed. The graph 602 represents the speed of the vehicle 10 as a function of time. The graph 604 represents the generation of the estimated vehicle mass as a function of time.

The acceleration of the vehicle 10 is increased from an initial speed $v_0$ to a second speed v*. The relationship 606 illustrates an increase in the speed of the vehicle 10 as a result of an application of a first acceleration to the vehicle 10. The relationship 608 illustrates the convergence of the estimated vehicle mass to a first estimated vehicle mass value 610 as generated by the vehicle mass estimation observation model based on the application of the first acceleration.

The relationship 612 illustrates the increase in the speed of the vehicle 10 from the initial speed $v_0$ to the second speed v* based on an application of a temporary excitation acceleration to the vehicle 10 in accordance with at least one embodiment. The temporary excitation acceleration generated by the vehicle parameter estimation system 100 is greater than a minimum excitation acceleration and less than the maximum desired acceleration. The temporary excitation acceleration is greater than the first acceleration. The relationship 614 illustrates the convergence of the estimated vehicle mass to a second estimated vehicle mass value 616 as generated by the vehicle mass estimation observation model based on the application of the temporary excitation acceleration.

The second estimated vehicle mass value 616 generated by the vehicle mass estimation observation model as a result of the application of the temporary excitation acceleration is closer to the actual vehicle mass m* than the first estimated vehicle mass value 610 generated by the vehicle mass estimation observation model as a result of the application of the first acceleration. The rate at which the vehicle mass converges to the second estimated vehicle mass value 616 is faster than the rate at which the vehicle mass converges to the first estimated vehicle mass value 610. The use of the vehicle parameter estimation system 100 may result in a faster and more accurate generation of an estimated vehicle mass of the vehicle 10 by a vehicle mass estimation observation model.

Figure 7:
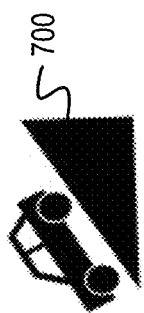
FIG. 7 is an exemplary illustration associated with generation of an estimated vehicle mass of a vehicle on a downhill grade by a vehicle parameter estimation system in accordance with at least one embodiment.
Figure 7:
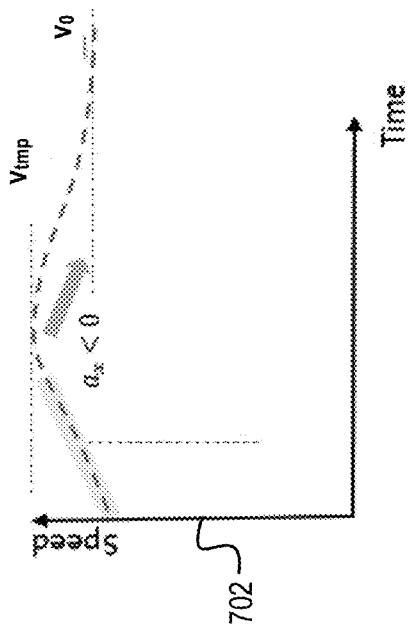

Referring to FIG. 7, an exemplary illustration associated with generation of an estimated vehicle mass of a vehicle 10 on a downhill grade 700 by a vehicle parameter estimation system 100 in accordance with at least one embodiment is shown. The ADAS 214 of the vehicle 10 was previously provided with a default vehicle mass. The vehicle 10 has been loaded with a payload so the actual vehicle mass as defined by the combination of the mass of the vehicle 10 and the payload has changed. The graph 702 represents the speed of the vehicle 10 as a function of time.

When the vehicle parameter estimation system 100 determines that the vehicle is on a downhill grade 700, the vehicle parameter estimation system 100 generates a control input for transmission to the ADAS 214 of the vehicle 10 to apply a temporary excitation acceleration to the vehicle 10 in a longitudinal direction in accordance with at least one embodiment. The temporary excitation acceleration includes a temporary positive acceleration applied to the vehicle 10 having an initial speed of $v_0$ until the vehicle 10 reaches a temporary speed $v_{tmp}$ followed by a temporary negative acceleration until the vehicle 10 returns to the initial speed $v_0$. The application of the temporary negative excitation acceleration to the vehicle 10 induces additional longitudinal excitation needed to the generate the estimated vehicle mass by the vehicle mass estimation observation model.

Figure 8:
FIG. 8 is an exemplary illustration associated with generation of an estimated vehicle mass of a vehicle on an uphill grade by a vehicle parameter estimation system in accordance with at least one embodiment.
Figure 8:
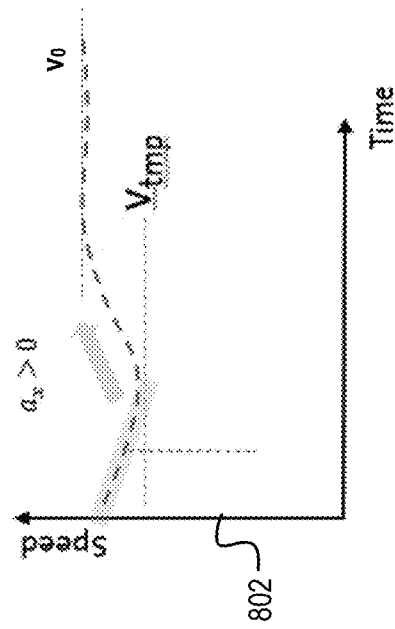

Referring to FIG. 8, an exemplary illustration associated with generation of an estimated vehicle mass of a vehicle 10 on an uphill grade 800 by a vehicle parameter estimation system 100 in accordance with at least one embodiment is shown. The ADAS 214 of the vehicle 10 was previously provided with a default vehicle mass. The vehicle 10 has been loaded with a payload so the actual vehicle mass as defined by the combination of the mass of the vehicle 10 and the payload has changed. The graph 802 represents the speed of the vehicle 10 as a function of time.

When the vehicle parameter estimation system 100 determines that the vehicle is on an uphill grade 800, the vehicle parameter estimation system 100 generates a control input for transmission to the ADAS 214 of the vehicle 10 to apply a temporary excitation acceleration to the vehicle 10 in a longitudinal direction in accordance with at least one embodiment. The temporary excitation acceleration includes a temporary negative acceleration applied to the vehicle 10 having an initial speed of $v_0$ until the vehicle 10 falls to a temporary speed $v_{tmp}$ followed by a temporary positive acceleration until the vehicle 10 returns to the initial speed $v_0$. The application of the temporary positive excitation acceleration to the vehicle 10 induces the additional longitudinal excitation needed to the generate the estimated vehicle mass by the vehicle mass estimation observation model.

Figure 9:
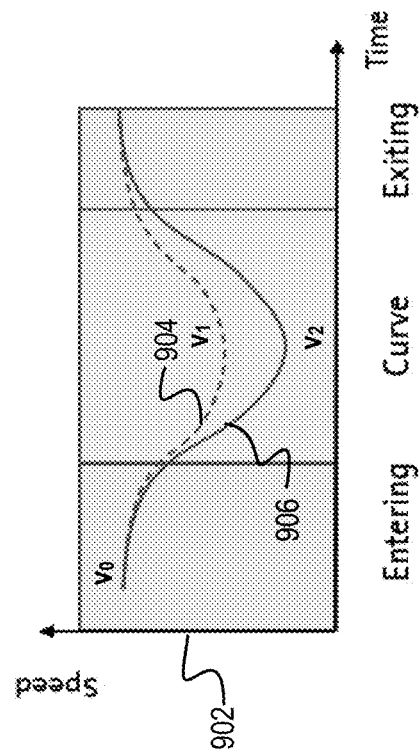
FIG. 9 is an exemplary illustration associated with generation of an estimated moment of inertia and/or an estimated understeer gradient of a vehicle by a vehicle parameter estimation system in accordance with at least one embodiment.
Figure 9:
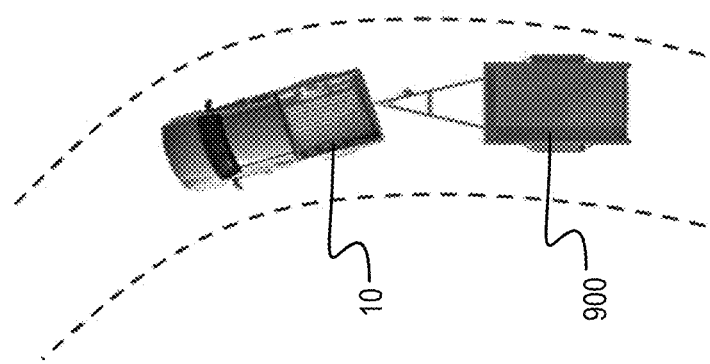

Referring to FIG. 9, an exemplary illustration associated with generation of an estimated moment of inertia $I_Z$ and/or an estimated understeer gradient $K_{US}$ of a vehicle 10 by a vehicle parameter estimation system 100 in accordance with at least one embodiment is shown. The ADAS 214 of the vehicle 10 was previously provided with a default moment of inertia $I_Z$ and/or a default understeer gradient $K_{US}$. The vehicle 10 has been attached to a trailer 900 so that the moment of inertia $I_Z$ and the understeer gradient $K_{US}$ as defined by the combination of the mass of the vehicle 10 and the mass of the trailer 900 has changed. The graph 902 represents the speed of the vehicle 10 as a function of time.

The relationship 904 illustrates the behavior of the vehicle 10 without the use of the vehicle parameter estimation system 100. When the vehicle 10 enters the curved portion of the road, the acceleration of the vehicle 10 is decreased as the vehicle 10 goes from an initial speed $v_0$ to a first speed $v_1$ and then increased as the vehicle 10 goes from the first speed $v_1$ back to the initial speed $v_0$ as the vehicle 10 exits the curved portion of the road.

The relationship 906 illustrates the behavior of the vehicle 10 with the use of the vehicle parameter estimation system 100 in accordance with at least one embodiment. When the vehicle 10 enters the curved portion of the road, the acceleration of the vehicle 10 is decreased as the vehicle 10 goes from an initial speed $v_0$ to a second speed $v_2$ and then increased as the vehicle 10 goes from the second speed $v_2$ back to the initial speed $v_0$ as the vehicle 10 exits the curved portion of the road. The second speed $v_2$ is lower than the first speed $v_1$. A temporary excitation acceleration is generated in a lateral direction when the vehicle 10 turns at a higher vehicle speed along the curved portion of the road than in the scenario shown by relationship 904. The application of the temporary excitation acceleration induces the additional lateral excitation needed to the generate the estimated moment of inertia $I_Z$ by the vehicle moment of inertia estimation observation model and/or the estimated understeer gradient $K_{US}$ by the understeer gradient estimation observation model.

The temporary excitation acceleration generated by the vehicle parameter estimation system 100 is greater than a minimum excitation acceleration and less than the maximum desired acceleration. The use of the vehicle parameter estimation system 100 may result in a faster and more accurate generation of an estimated vehicle moment of inertia $I_Z$ and/or an estimated understeer gradient $K_{US}$. Upon the convergence of the estimated vehicle moment of inertia $I_Z$ and/or the estimated understeer gradient $K_{US}$, the application of the temporary excitation acceleration used to generate the lateral excitation is stopped. In super cruise applications, the speed during curve navigation is initially reduced so that the vehicle 10 with the trailer 900 navigates the turn on the curved portion of the road at a higher speed, thereby providing additional lateral excitation to generate the estimated understeer gradient $K_{US}$ and/or estimated moment of inertia $I_Z$ using the associated parameter estimation observation models.

Figure 10:
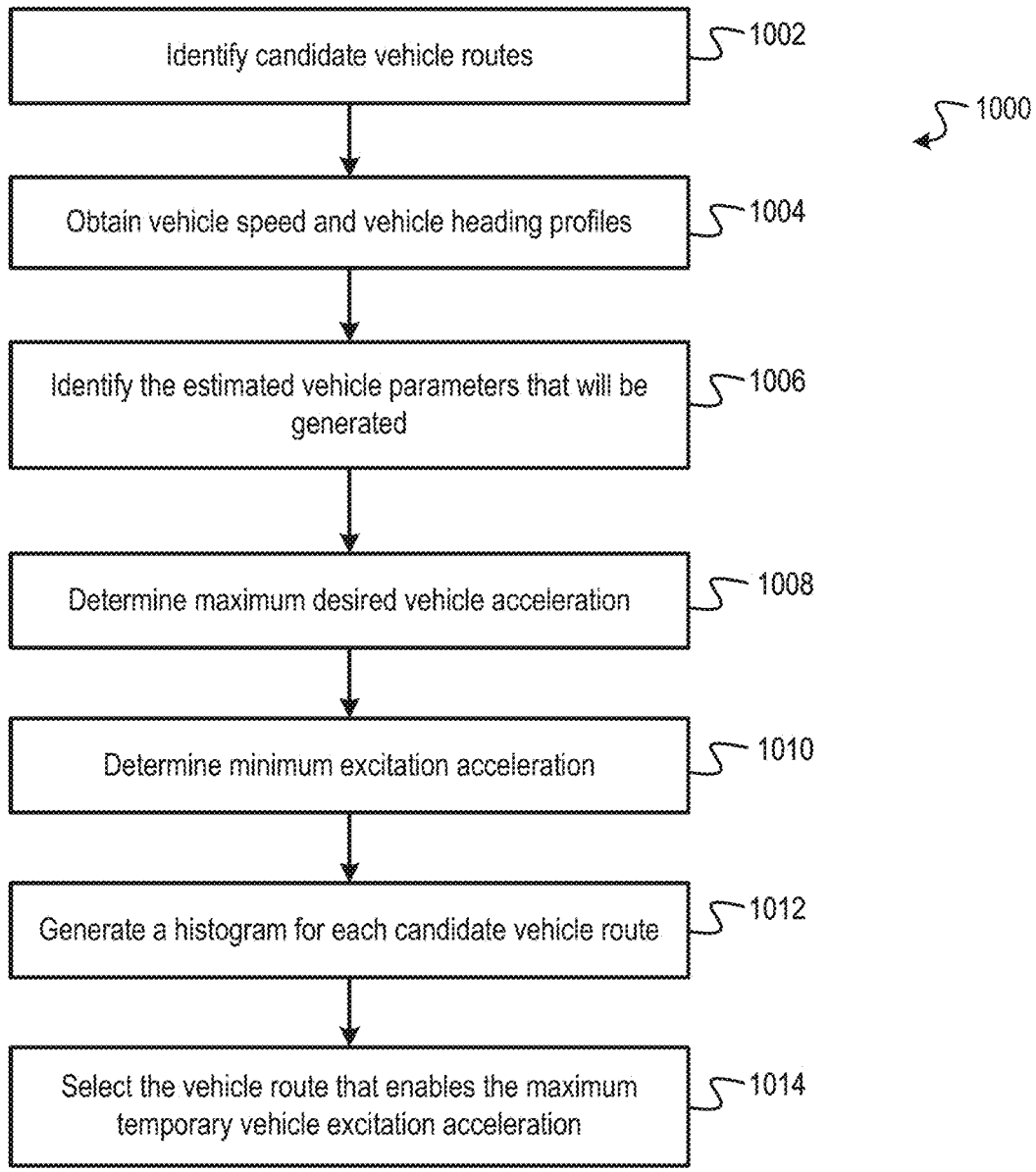
FIG. 10, a flowchart representation of an exemplary method of selecting a vehicle route for the application of a temporary acceleration excitation to a vehicle by a vehicle parameter estimation system in accordance with at least one embodiment.

Referring to FIG. 10, a flowchart representation of an exemplary method 1000 of selecting a vehicle route for the application of a temporary acceleration excitation to a vehicle 10 by a vehicle parameter estimation system 100 in accordance with at least one embodiment is shown. The method 1000 will be described with reference to an exemplary implementation of the vehicle parameter estimation system 100. As can be appreciated in light of the disclosure, the order of operation within the method 1000 is not limited to the sequential execution as illustrated in FIG. 10 but may be performed in one or more varying orders as applicable and in accordance with the present disclosure.

At 1002, the vehicle parameter estimation system 100 identifies candidate vehicle routes. In various embodiments, the candidate vehicle routes are the vehicle routes that are available from an initial location to a destination location. At 1004, the vehicle parameter estimation system 100 obtains the vehicle speed and the vehicle heading profiles. The vehicle states of the vehicle 10 include the current vehicle speed and the vehicle heading profiles. At 1006, the vehicle parameter estimation system 100 identifies the estimated vehicle parameters that will be generated. Examples of vehicle estimation parameters include, an estimated vehicle mass, an estimated moment of inertia $I_Z$ and an estimated understeer gradient $K_{US}$.

At 1008, the vehicle parameter estimation system 100 determines the maximum desired vehicle acceleration based on one or more of the vehicle states. The maximum desired vehicle acceleration defines the maximum temporary excitation acceleration that can be applied to the vehicle 10 in the specific direction while ensuring vehicle safety and vehicle occupant comfort. If the estimated vehicle parameter that will be generated is an estimated vehicle mass, the maximum desired vehicle acceleration defines the maximum temporary excitation acceleration that can be applied to the vehicle 10 in a longitudinal direction. If the estimated vehicle parameter that will be generated is the estimated moment of inertia $I_Z$ and/or the estimated understeer gradient $K_{US}$ the maximum desired vehicle acceleration defines the maximum temporary excitation acceleration that can be applied to the vehicle 10 in a lateral direction.

At 1010, the vehicle parameter estimation system 100 determines the minimum excitation acceleration based on one or more of the vehicle states. The minimum excitation acceleration is the minimum amount of excitation acceleration needed to generate an estimated vehicle parameter for the vehicle 10. If the vehicle parameter estimation system 100 is generating an estimated vehicle mass, the vehicle parameter estimation system 100 determines a minimum excitation acceleration of the vehicle 10 in a longitudinal direction. If the vehicle parameter estimation system 100 is generating an estimated moment of inertia $I_Z$ and/or an estimated understeer gradient $K_{US}$, the vehicle parameter estimation system 100 determines a minimum excitation acceleration of the vehicle 10 in a lateral direction.

At 1012, the vehicle parameter estimation system 100 generates a histogram for each of the candidate routes. At 1014, the vehicle parameter estimation system 100 selects a vehicle route from the candidate vehicle routes that permits the application of the highest amount of temporary excitation acceleration. The temporary excitation acceleration is greater than the minimum excitation acceleration and less than the maximum desired vehicle acceleration.

If the estimated vehicle parameter that will be generated is an estimated vehicle mass, the vehicle parameter estimation system 100 selects a vehicle route from the candidate vehicle routes that permits the application of the greatest amount of temporary excitation acceleration in a longitudinal direction. If the estimated vehicle parameter that will be generated is an estimated moment of inertia $I_Z$ and/or an estimated understeer gradient $K_{US}$ the vehicle parameter estimation system 100 selects a vehicle route from the candidate vehicle routes that permits the application of the highest amount of temporary excitation acceleration in a lateral direction.

Figure 11:
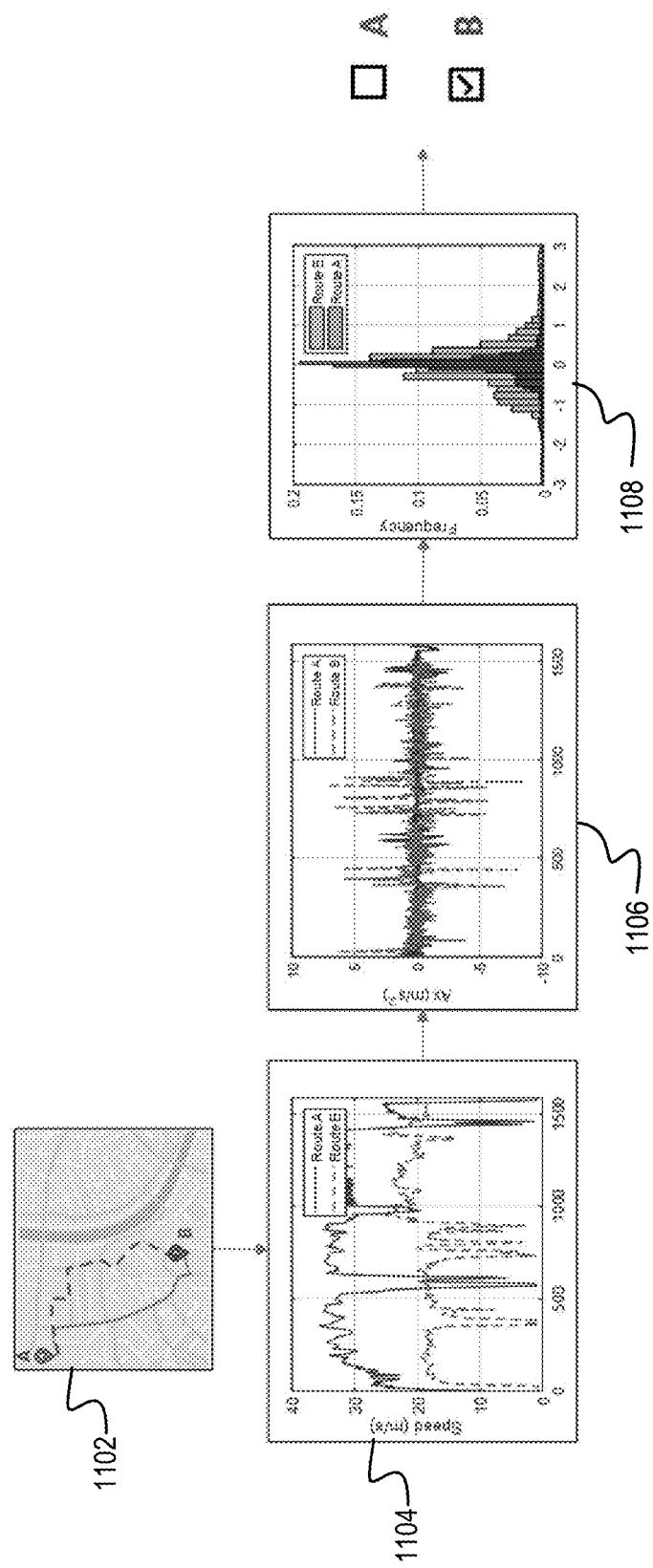
FIG. 11 depicts exemplary graphs and a histogram associated with two candidate vehicle routes in accordance with at least one embodiment.

Referring to FIG. 11, exemplary graphs and a histogram associated with two candidate vehicle routes A. B in accordance with at least one embodiment are shown. The A map 1102 depicts the two candidate routes A. B. The vehicle parameter estimation system 100 is generating an estimated vehicle mass. The graph 1104 illustrates the vehicle speed along the each of the candidate routes A, B. The graph 1106 illustrates the maximum temporary excitation acceleration that can be applied to the vehicle 10 along the two candidate routes A, B.

The addition of a trailer to a vehicle 10 may impact the longitudinal and lateral response of the vehicle 10 and impact implementation of one or more ADAS features. Examples of such features include, but are not limited to, adaptive cruise control (ACC) and super cruise (SC) control. Generating accurate estimated vehicle parameters may lead to improvements in longitudinal and lateral performance of the vehicle 10. The intentional addition of longitudinal and/or lateral temporary excitation accelerations that fall within the boundaries of vehicle safety and vehicle occupant comfort may lead to improvements in accuracy in the generation of the estimated vehicle parameters.

The adjustment of ACC modification gains may enable following speed set points more aggressively. Temporary adjustments may be made to a vehicle driver mode to increase the responsiveness of an acceleration pedal. Examples of vehicle driver modes include, but are not limited to, tour mode and sport mode. The selection of vehicle routes may enable the implementation increased amounts of temporary excitation acceleration to generate improved vehicle parameter estimations. For example, a twisting urban route may be preferrable to a highway route to generate improved estimated moment of inertia $I_Z$ and estimated understeer gradient $K_{US}$ values.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A vehicle parameter estimation system of a vehicle comprising:
    at least one processor; and
    at least one memory communicatively coupled to the at least one processor, the at least one memory comprising instructions that upon execution by the at least one processor, cause the at least one processor to:
        determine a maximum desired vehicle acceleration in a lateral direction;
        determine a minimum excitation acceleration in the lateral direction, the minimum excitation acceleration being associated with generating an estimated moment of inertia of the vehicle and an estimated understeer gradient of the vehicle;
        generate a first control input for transmission to an advanced driver assistance system (ADAS) of the vehicle to initiate an application of a temporary excitation acceleration that is greater than the minimum excitation acceleration and less than the maximum desired vehicle acceleration to the vehicle in the lateral direction;
        generate the estimated moment of inertia using a vehicle moment of inertia estimation observation model and the estimated understeer gradient using an understeer gradient estimation observation model based on vehicle data received from at least one vehicle sensor, the vehicle data being generated in response to the application of the temporary excitation acceleration to the vehicle;
        upon a determination by the vehicle moment of inertia estimation observation model that the estimated moment of inertia has converged and a determination by the understeer gradient estimation observation model that the estimated understeer gradient has converged, generate a second control input for transmission to the ADAS of the vehicle to cease the application of the temporary excitation acceleration to the vehicle in the lateral direction; and
        transmit the estimated moment of inertia and the estimated understeer gradient to the ADAS of the vehicle for replacement of a previous moment of inertia and a previous understeer gradient at the ADAS with the estimated moment of inertia and the estimated understeer gradient.

2. The system of claim 1, wherein the at least one memory comprises further instructions that upon execution by the at least one processor, cause the at least one processor to determine the maximum desired vehicle acceleration based on at least a maximum safe acceleration in the lateral direction.

3. The system of claim 1, wherein the at least one memory comprises further instructions that upon execution by the at least one processor, cause the at least one processor to determine the maximum desired vehicle acceleration based on at least a maximum occupant comfort acceleration in the lateral direction.

4. The system of claim 1, wherein the at least one memory comprises further instructions that upon execution by the at least one processor, cause the at least one processor to generate a third control input for transmission to the ADAS of the vehicle to apply another temporary excitation acceleration to the vehicle in a longitudinal direction.

5. The system of claim 4, wherein the at least one memory comprises further instructions that upon execution by the at least one processor, cause the at least one processor to:
    receive the vehicle data generated in response to the application of the another temporary excitation acceleration to the vehicle in the longitudinal direction; and
    generate an estimated vehicle mass using a vehicle mass estimation observation model based on the vehicle data.

6. The system of claim 1, wherein the at least one memory comprises further instructions that upon execution by the at least one processor, cause the at least one processor to select a vehicle route that includes at least one curved portion to enable the application of the temporary excitation acceleration to the vehicle in the lateral direction.

7. The system of claim 5, wherein the at least one memory comprises further instructions that upon execution by the at least one processor, cause the at least one processor to select a vehicle route that includes at least one straight portion to enable the application of the another temporary excitation acceleration to the vehicle in the longitudinal direction.

8. The system of claim 5, wherein the at least one memory comprises further instructions that upon execution by the at least one processor, cause the at least one processor to:
    determine whether a vehicle route includes a downhill grade; and
    generate the third control input for transmission to the ADAS of the vehicle to apply the another temporary excitation acceleration to the vehicle in the longitudinal direction, the another temporary excitation acceleration being a temporary positive acceleration followed by a temporary negative acceleration.

9. The system of claim 5, wherein the at least one memory comprises further instructions that upon execution by the at least one processor, cause the at least one processor to:
  determine whether a vehicle route includes an uphill grade; and
  generate the third control input for transmission to the ADAS of the vehicle to apply the another temporary excitation acceleration to the vehicle in the longitudinal direction, the another temporary excitation acceleration being a temporary negative acceleration followed by a temporary positive acceleration.

10. The system of claim 1, wherein the at least one memory comprises further instructions that upon execution by the at least one processor, cause the at least one processor to:
  identify a first candidate vehicle route and a second candidate vehicle route for the vehicle between an initial location and a destination location;
  obtain a vehicle state of the vehicle, the vehicle state comprising a current vehicle speed and a vehicle heading profile;
  determine a first maximum temporary excitation acceleration in the lateral direction that can be applied to the vehicle on the first candidate vehicle route based on the vehicle state;
  determine a second maximum temporary excitation acceleration in the lateral direction that can be applied to the vehicle on the second candidate vehicle route based on the vehicle state;
  select the first candidate vehicle route as a vehicle route if the first maximum temporary excitation acceleration is greater than the second maximum temporary excitation acceleration and select the second candidate vehicle route as the vehicle route if the second maximum temporary excitation acceleration is greater than the first maximum temporary excitation acceleration.

11. A method for estimating vehicle parameters of a vehicle comprising:
  determining a maximum desired vehicle acceleration in a lateral direction;
  determining a minimum excitation acceleration in the lateral direction, the minimum excitation acceleration being associated with generating an estimated moment of inertia and an estimated understeer gradient of the vehicle;
  generating a first control input for transmission to an advanced driver assistance system (ADAS) of the vehicle to initiate application of a temporary excitation acceleration that is greater than the minimum excitation acceleration and less than the maximum desired vehicle acceleration to the vehicle in the lateral direction;
  generating the estimated moment of inertia using a vehicle moment of inertia estimation observation model and the estimated understeer gradient using an understeer gradient estimation observation model based on vehicle data received from at least one vehicle sensor, the vehicle data being generated in response to the application of the temporary excitation acceleration to the vehicle;
  upon a determination by the vehicle moment of inertia estimation observation model that the estimated moment of inertia has converged and a determination by the understeer gradient estimation observation model that the estimated understeer gradient has converged, generating a second control input for transmission to the ADAS of the vehicle to cease the application of the temporary excitation acceleration to the vehicle in the lateral direction; and
  transmitting the estimated moment of inertia and the estimated understeer gradient to the ADAS of the vehicle for replacement of a previous moment of inertia and a previous understeer gradient at the ADAS with the estimated moment of inertia and the estimated understeer gradient.

12. The method of claim 11, further comprising determining the maximum desired vehicle acceleration based on at least a maximum safe acceleration in the lateral direction.

13. The method of claim 11, further comprising determining the maximum desired vehicle acceleration based on at least a maximum occupant comfort acceleration in the lateral direction.

14. The method of claim 11, further comprising generating a third control input for transmission to the ADAS of the vehicle to apply another temporary excitation acceleration to the vehicle in a longitudinal direction.

15. The method of claim 11, further comprising:
  identifying a first candidate vehicle route and a second candidate vehicle route for the vehicle between an initial location and a destination location;
  obtaining a vehicle state of the vehicle, the vehicle state comprising a current vehicle speed and a vehicle heading profile;
  determining a first maximum temporary excitation acceleration in the lateral direction that can be applied to the vehicle on the first candidate vehicle route based on the vehicle state;
  determining a second maximum temporary excitation acceleration in the lateral direction that can be applied to the vehicle on the second candidate vehicle route based on the vehicle state;
  selecting the first candidate vehicle route as a vehicle route if the first maximum temporary excitation acceleration is greater than the second maximum temporary excitation acceleration and select the second candidate vehicle route as the vehicle route if the second maximum temporary excitation acceleration is greater than the first maximum temporary excitation acceleration.

16. A vehicle including a vehicle parameter estimation system comprising:
  at least one processor; and
  at least one memory communicatively coupled to the at least one processor, the at least one memory comprising instructions that upon execution by the at least one processor, cause the at least one processor to:
    determine a maximum desired vehicle acceleration in a lateral direction;
    determine a minimum excitation acceleration in the lateral direction, the minimum excitation acceleration being associated with generating an estimated moment of inertia of the vehicle and an estimated understeer gradient of the vehicle;
    generate a first control input for transmission to an advanced driver assistance system (ADAS) of the vehicle to initiate application of a temporary excitation acceleration that is greater than the minimum excitation acceleration and less than the maximum desired vehicle acceleration to the vehicle in the lateral direction;
    generate the estimated moment of inertia using a vehicle moment of inertia estimation observation model and the estimated understeer gradient using an understeer gradient estimation observation model based on vehicle data received from at least one vehicle sensor, the vehicle data being generated in response to the application of the temporary excitation acceleration to the vehicle;

upon a determination by the vehicle moment of inertia estimation observation model that the estimated moment of inertia has converged and a determination by the understeer gradient estimation observation model that the estimated understeer gradient has converged, generate a second control input for transmission to the ADAS of the vehicle to cease the application of the temporary excitation acceleration to the vehicle in the lateral direction; and transmit the estimated moment of inertia and the estimated understeer gradient to the ADAS of the vehicle for replacement of a previous moment of inertia and a previous understeer gradient at the ADAS with the estimated moment of inertia and the estimated understeer gradient.

17. The vehicle of claim 16, wherein the at least one memory comprises further instructions that upon execution by the at least one processor, cause the at least one processor to determine the maximum desired vehicle acceleration based on at least a maximum occupant comfort acceleration in the lateral direction.

18. The vehicle of claim 16, wherein the at least one memory comprises further instructions that upon execution by the at least one processor, cause the at least one processor to determine the maximum desired vehicle acceleration based on at least a maximum occupant comfort acceleration in the lateral direction.

19. The vehicle of claim 16, wherein the at least one memory comprises further instructions that upon execution by the at least one processor, cause the at least one processor to select a vehicle route that includes at least one curved portion to enable the application of the temporary excitation acceleration to the vehicle in the lateral direction.

20. The vehicle of claim 16, wherein the at least one memory comprises further instructions that upon execution by the at least one processor, cause the at least one processor to:

identify a first candidate vehicle route and a second candidate vehicle route for the vehicle between an initial location and a destination location;

obtain a vehicle state of the vehicle, the vehicle state comprising a current vehicle speed and a vehicle heading profile;

determine a first maximum temporary excitation acceleration in the lateral direction that can be applied to the vehicle on the first candidate vehicle route based on the vehicle state;

determine a second maximum temporary excitation acceleration in the lateral direction that can be applied to the vehicle on the second candidate vehicle route based on the vehicle state;

select the first candidate vehicle route as a vehicle route if the first maximum temporary excitation acceleration is greater than the second maximum temporary excitation acceleration and select the second candidate vehicle route as the vehicle route if the second maximum temporary excitation acceleration is greater than the first maximum temporary excitation acceleration.

* * * * *